(12) United States Patent
Sabin et al.

(10) Patent No.: US 10,503,914 B2
(45) Date of Patent: *Dec. 10, 2019

(54) TECHNIQUES FOR SECURITY AUDITING OF CLOUD RESOURCES

(71) Applicant: Micro Focus Software Inc., Wilmington, DE (US)

(72) Inventors: Jason Allen Sabin, Lehi, UT (US); Michael John Jorgensen, Mapleton, UT (US); Lloyd Leon Burch, Payson, UT (US); Jeremy Ray Brown, Bluffdale, UT (US); Nathaniel Brent Kranendonk, Springville, UT (US); Kal A. Larsen, Springville, UT (US); Michael Fairbanks, Lindon, UT (US); Matthew Holt, Provo, UT (US)

(73) Assignee: Micro Focus Software Inc., Wilmington, DE (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/459,314

(22) Filed: Mar. 15, 2017

(65) Prior Publication Data

US 2017/0193237 A1   Jul. 6, 2017

Related U.S. Application Data

(63) Continuation of application No. 13/149,097, filed on May 31, 2011, now Pat. No. 9,619,262.

(51) Int. Cl.
G06F 21/60 (2013.01)
G06F 21/50 (2013.01)
(Continued)

(52) U.S. Cl.
CPC ........ G06F 21/602 (2013.01); G06F 9/45533 (2013.01); G06F 9/45558 (2013.01);
(Continued)

(58) Field of Classification Search
CPC .............. G06F 21/602; G06F 9/45533; G06F 9/45558; G06F 2009/45587; G06F 21/60;
(Continued)

(56) References Cited

U.S. PATENT DOCUMENTS 5,889,943 A    3/1999  Ji et al.
8,010,667 B2   8/2011  Zhang et al.
(Continued)

OTHER PUBLICATIONS

Dutta, "Security and Forensics Challenges of Cloud Computing", Master Thesis, Department of Information Technology, Jadavpur University, (May 2010), 1-93.*

(Continued)

*Primary Examiner* — Jayesh M Jhaveri
(74) *Attorney, Agent, or Firm* — Schwegman Lundberg & Woessner, P.A.

(57) ABSTRACT

Techniques for security auditing of cloud resources are provided. A virtual machine (VM) is captured and isolated when a session indicates that a session with the VM has terminated. Security checks are executed against the VM in the isolated environment. Results from the security checks are then reported.

19 Claims, 4 Drawing Sheets

(51) Int. Cl.
*G06F 21/52* (2013.01)
*G06F 21/53* (2013.01)
*G06F 9/455* (2018.01)
*H04L 29/06* (2006.01)

(52) U.S. Cl.
CPC .......... *G06F 21/53* (2013.01); *H04L 63/1416* (2013.01); *G06F 21/50* (2013.01); *G06F 21/52* (2013.01); *G06F 2009/45587* (2013.01); *H04L 63/14* (2013.01)

(58) Field of Classification Search
CPC .......... G06F 9/455; G06F 21/50; G06F 21/52; G06F 21/53; H04L 29/06; H04L 63/14; H04L 63/1416
See application file for complete search history.

(56) References Cited

U.S. PATENT DOCUMENTS

| | | | |
|---|---|---|---|
| 8,055,737 B2 | 11/2011 | Ciano | |
| 8,560,709 B1* | 10/2013 | Shokhor | H04L 63/20 709/203 |
| 9,104,458 B1* | 8/2015 | Brandwine | G06F 9/45558 |
| 2006/0136720 A1 | 6/2006 | Armstrong et al. | |
| 2006/0185015 A1 | 8/2006 | Cheston et al. | |
| 2007/0039053 A1 | 2/2007 | Dvir | |
| 2008/0134176 A1* | 6/2008 | Fitzgerald | G06F 9/45537 718/1 |
| 2008/0134178 A1 | 6/2008 | Fitzgerald et al. | |
| 2010/0017512 A1* | 1/2010 | Ciano | G06F 9/455 709/225 |
| 2010/0125903 A1 | 5/2010 | Devarajan et al. | |
| 2010/0217850 A1 | 8/2010 | Ferris | |
| 2010/0251328 A1 | 9/2010 | Syed et al. | |
| 2010/0251363 A1 | 9/2010 | Todorovic | |
| 2010/0257605 A1 | 10/2010 | McLaughlin et al. | |
| 2011/0072489 A1 | 3/2011 | Parann-Nissany | |
| 2011/0107331 A1 | 5/2011 | Evans et al. | |
| 2011/0154023 A1* | 6/2011 | Smith | G06F 21/78 713/155 |
| 2012/0151582 A1 | 6/2012 | Reasor et al. | |
| 2012/0174218 A1* | 7/2012 | McCoy | H04L 63/0281 726/22 |
| 2012/0266231 A1 | 10/2012 | Spiers et al. | |
| 2012/0303826 A1 | 11/2012 | Nelson et al. | |
| 2012/0311344 A1 | 12/2012 | Sabin et al. | |

OTHER PUBLICATIONS

Ruan, et a!., "Cloud Forensics", Chapter 3, Advances in Digital Forensics VII, 7th IFiP WG j 11,9 International Conference on Digital Forensics Orlando, FL, USA, (Jan. 31-Feb. 2, J201J), 35-48.*
U.S. Appl. No. 13/149,097, filed May 31, 2011, Techniques for Security Auditing of Cloud Resources.
"U.S. Appl. No. 13/149,097, Advisory Action dated Feb. 26, 2016", 3 pgs.
"U.S. Appl. No. 13/149,097, Advisory Action dated Oct. 10, 2013", 3 pgs.
"U.S. Appl. No. 13/149,097, Advisory Action dated Nov. 14, 2014", 3 pgs.
"U.S. Appl. No. 13/149,097, Final Office Action dated Jul. 12, 2013", 22 pgs.
"U.S. Appl. No. 13/149,097, Final Office Action dated Aug. 27, 2014", 29 pgs.
"U.S. Appl. No. 13/149,097, Final Office Action dated Dec. 11, 2015", 31 pgs.
"U.S. Appl. No. 13/149,097, Non Final Office Action dated Jan. 3, 2013", 22 pgs.
"U.S. Appl. No. 13/149,097, Non Final Office Action dated Jan. 31, 2014", 23 pgs.
"U.S. Appl. No. 13/149,097, Non Final Office Action dated Jul. 14, 2015", 25 pgs.
"U.S. Appl. No. 13/149,097, Notice of Allowance dated Dec. 16, 2016", 13 pgs.
"U.S. Appl. No. 13/149,097, Response filed Feb. 11, 2016 to Final Office Action dated Dec. 11, 2015", 8 pgs.
"U.S. Appl. No. 13/149,097, Response filed Apr. 2, 2013 to Non Final Office Action dated Jan. 3, 2013", 11 pgs.
"U.S. Appl. No. 13/149,097, Response filed Apr. 30, 2014 to Non Final Office Action dated Jan. 31, 2014", 10 pgs.
"U.S. Appl. No. 13/149,097, Response filed Sep. 12, 2013 to Final Office Action dated Jul. 12, 2013", 8 pgs.
"U.S. Appl. No. 13/149,097, Response filed Oct. 14, 2015 to Non Final Office Action dated Jul. 14, 2015", 9 pgs.
"U.S. Appl. No. 13/149,097, Response filed Oct. 27, 2014 to Final Office Action dated Aug. 27, 2014", 8 pgs.
"U.S. Appl. No. 13/149,097, Response filed Nov. 26, 2014 to Advisory Action dated Nov. 14, 2014", 9 pgs.
Ruan, et al., "Cloud Forensics", Chapter 3, Advances in Digital Forensics VII, 7th IFIP WG 11.9 International Conference on Digital Forensics Orlando, FL, USA, (Jan. 31-Feb. 2, 2011), 35-46.

* cited by examiner

TECHNIQUES FOR SECURITY AUDITING OF CLOUD RESOURCES

This application is a continuation of U.S. patent application Ser. No. 13/149,097, filed May 31, 2011, which is incorporated herein by reference in its entirety.

BACKGROUND

Cloud computing is rapidly changing the Internet into a collection of clouds, which provide a variety of computing resources, storage resources, and, in the future, a variety of resources that are currently unimagined.

This new level of virtualization should have unbounded the physical and geographical limitations of traditional computing, but this is not yet the case largely in part because of current deficiencies associated with security auditing of virtualized resources. That is, enterprises have been reluctant to migrate some of their systems and resources because of the perceived lack of control and security assurances associated with migrated systems and resources.

The very nature of cloud resources (virtualization) means that the resources regularly appear and disappear over time. At the same time, businesses are rapidly moving to use Virtual Desktop Infrastructures. Yet, there is presently no mechanism to accurately perform security audits and checks on cloud based systems.

Furthermore, end users can install any number of applications, get viruses, miss-configure a system, and/or open the system up to security vulnerabilities and hacks. So, as cloud resources appear and disappear over time, there needs to be a way to audit and to check everyday what has occurred with the cloud-based systems as they are used. In this manner, if a security breach has occurred there needs to be some technique to quickly identify what happened; to possibly enroll an enterprise employee in additional security training; and to track exactly what is occurring with an enterprise's cloud based resources.

SUMMARY

Various embodiments of the invention provide techniques for security auditing of cloud resources. Specifically, a method for security auditing of cloud resources is presented.

An event is detected indicating that a session with a virtual machine (VM) has terminated. The VM is then moved to an isolated cloud network that has no access to a network once the VM is received in the isolated cloud network. Next, security checks are executed within the isolated cloud network against the VM. Finally, results are reported for the security checks.

DETAILED DESCRIPTION

Figure 1:
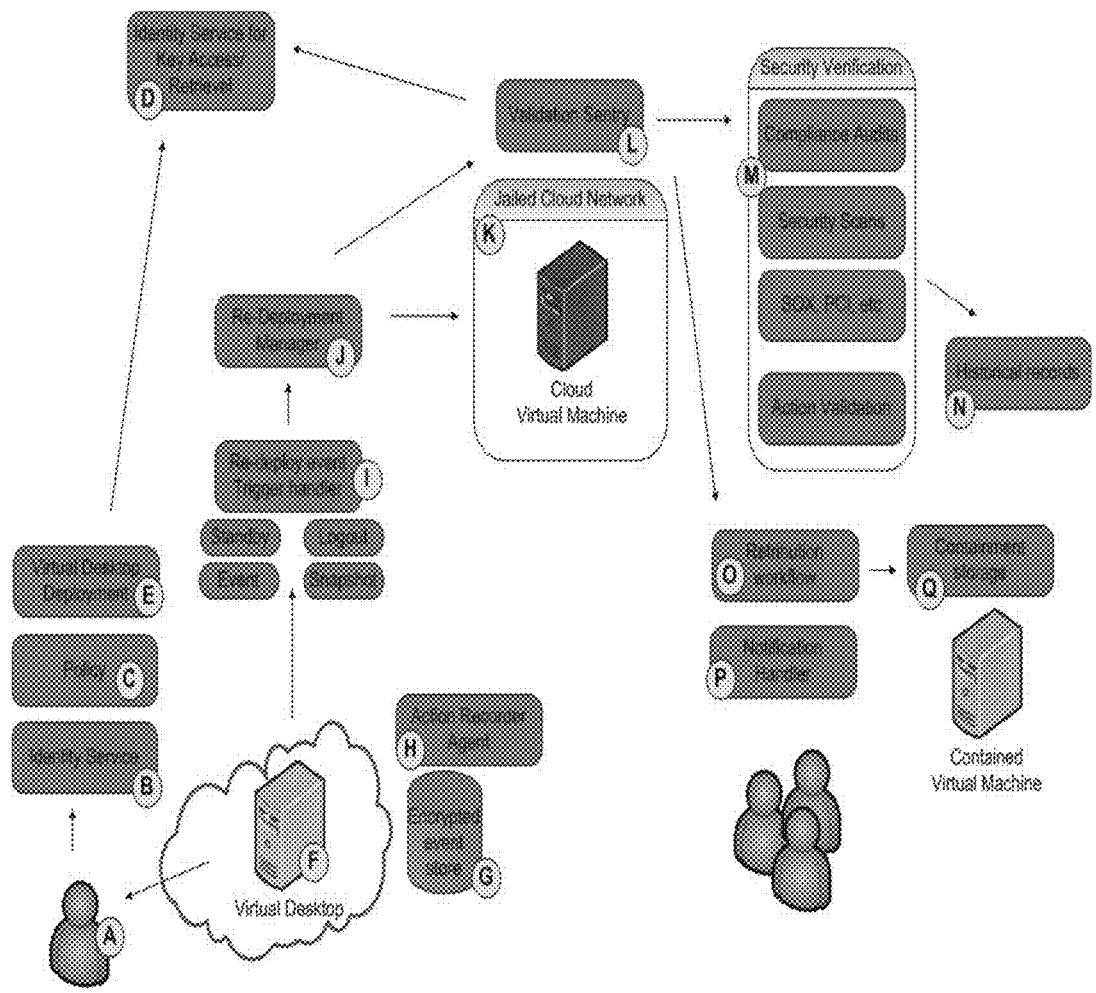
FIG. 1 is a diagram of an example architecture for security auditing of cloud resources, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "workload" as used herein refers to a special type of resource, such as a Virtual Machine (VM), an Operating System (OS), a hardware device, an agent, and/or an application.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

FIG. 1 is a diagram of an example architecture for security auditing of cloud resources, according to the techniques presented herein. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured to execute the components.

The FIG. 1 is presented with reference to a variety of specific example situations that an enterprise utilizing cloud environments can encounter. These are presented for purposes of illustration only as other situations can occur as well and still benefit from the techniques presented herein and below.

Techniques described herein and below take control of a virtual machine (VM) in a cloud when the user has finished with it for the day or when some other event has occurred. The instance of the cloud resource is then reloaded in a jailed network where a variety of processing is run against the jailed VM, such as: security audits, scans, and compliance checks. This information is validated to ensure that the jailed VM has not been compromised, is not open to security attacks, and the VM has passed compliance checks and can be used again in the future. Additionally, processing validates the actions in which the user had taken when he/she used the cloud resource (VM and before being jailed).

The processing depicted in the architecture of the FIG. 1 starts by initiating a VM. This VM can, in some cases, be part of a Virtual Desktop Infrastructure (VDI) environment, a resource that is accessed via a public or private cloud.

The process starts with the end user, at A. He/she requests a new VM. They perform an authentication to an identity service to validate their credentials and establish their identity, via B. Policy can be used to determine what type of VM needs to be deployed, via C. Policy also determines how secure this particular VM/VDI needs to be. The VM may be a financial VM, which needs to have every action performed on the VM recorded. If this is the case then an Identity-Service Key retrieval needs to occur, via D. This retrieves the public key associated with this VM transaction. The key is identified with this specific instance of a VM or desktop (VDI). The VM deployment, at E, instantiates VM/VDI, at F. It then creates an encrypted event store, at G, which all action events are recorded too via the public key that was retrieved for this VM/VDI instance. The private key is not stored on the VM. Then an Action Recorder Agent is embedded into the VM, at F. The Action Recorder Agent may be viewed as a special type of key logger and recording device. The Action Recorder Agent records every single key typed, command executed, and action taken during this entire process. The Action Recorder Agent records every event locally to the Encrypted Event Store.

As the user is using this VM he/she might logoff for the day. This triggers the Re-deploy Event Trigger Handler, at I. Other events that can trigger the Re-deploy Event Trigger Handler, including situations where: a VM goes into standby mode, a logout of user occurs, a pre-determined time has lapsed, a critical security warning has been issued, or any number of other pre-defined and customized event triggers. These event triggers are established and set within the policy decision made, at C. If an event is triggered, then the Re-Deployment Manager (Item J) shutdowns the VM. Additionally, instead of shutting down the actual VM a live snapshot can be taken of the VM. Once it has been shut down (or snapshot taken), the VM is moved to an isolated jailed cloud network, at K. This is a simulated network identical to the previous cloud network the VM was processing in, at F, but with the VM has no access. The VM has been jailed and is now going to de-contaminated and verified that it is still a secure machine and that it has not been compromised. Once the VM has been placed within this network the Validation Sentry, at L, can perform its job.

The Validation Sentry's job, at L, is to basically debrief, scan, check, and validate everything that occurred to this VM instance. The Validation Sentry runs a number of Security Verifications, at M, including: checking compliance audits, performing security scans, validating SOX/PCI, or performing any number of other customized compliance scans/audits. The Validation Sentry will also perform the Action Validation by getting the private key for this VM instance from the Identity Service Key Retrieval, at D. The Validation Sentry provides its credentials to get the private key from the Identity Service. Once the Validation Sentry has the private key, it can decrypt the event store and retrieve every action, key typed, and mouse event clicked that occurred within this particular jailed VM instance. The Validation Sentry can validate and scrutinize everything the user did on this VM instance. The Validation Sentry records all the results of all of this in Historical Records, at N, which can be analyzed at a later time.

Once all tests and verifications have been performed the Validation Sentry hands over the results to the Retribution Workflow process, at O. If a violation has happened, the Retribution Workflow processes places this VM instance into Containment Storage, at Q, to keep an exact copy and state of this VM. The Retribution Workflow process can also issue any notifications to the Notification Handler, at P. This can notify managers or anyone of the security warning or vulnerability that has occurred.

Additionally this instance of the VM can be compared with various other instances of the day, week, or any other previous time. The instance of the VM can also be compared against the various snapshots if snapshot instances were kept or the VM instance can be compared with the original template that the VM instance was created from.

The Retribution Workflow process can also sign up the employee for security training in response to their flagged security warnings. This could be how to safely browse the Internet, how to set a secure password, or how to configure the apache web server in a secure method, etc.

By using the techniques described herein above and below, a security failure can be identified when as soon as it has occurred and at which point in the VM instance lifecycle the failure has happened at.

Currently there is no viable mechanism in the market to perform security audits of cloud based resources.

Techniques presented herein above and below provide: the ability to jail a VM once it has been finished with by the user or when some event has been triggered; the ability to process audits, scans, and validate the entire usage of the VM within a jailed network by verifying the VM has not been tampered with or miss configured in anyway; the ability to track all events and recordings of the VM usage for use at a later time if retribution needs to occur.

The techniques herein can also be expanded to not only include individual users but also servers. For example say an email server expands and contracts to use cloud based resources. As servers are being removed, they can be placed into the jailed network and validated to check for everything that has occurred on a particular VM.

Figure 2:
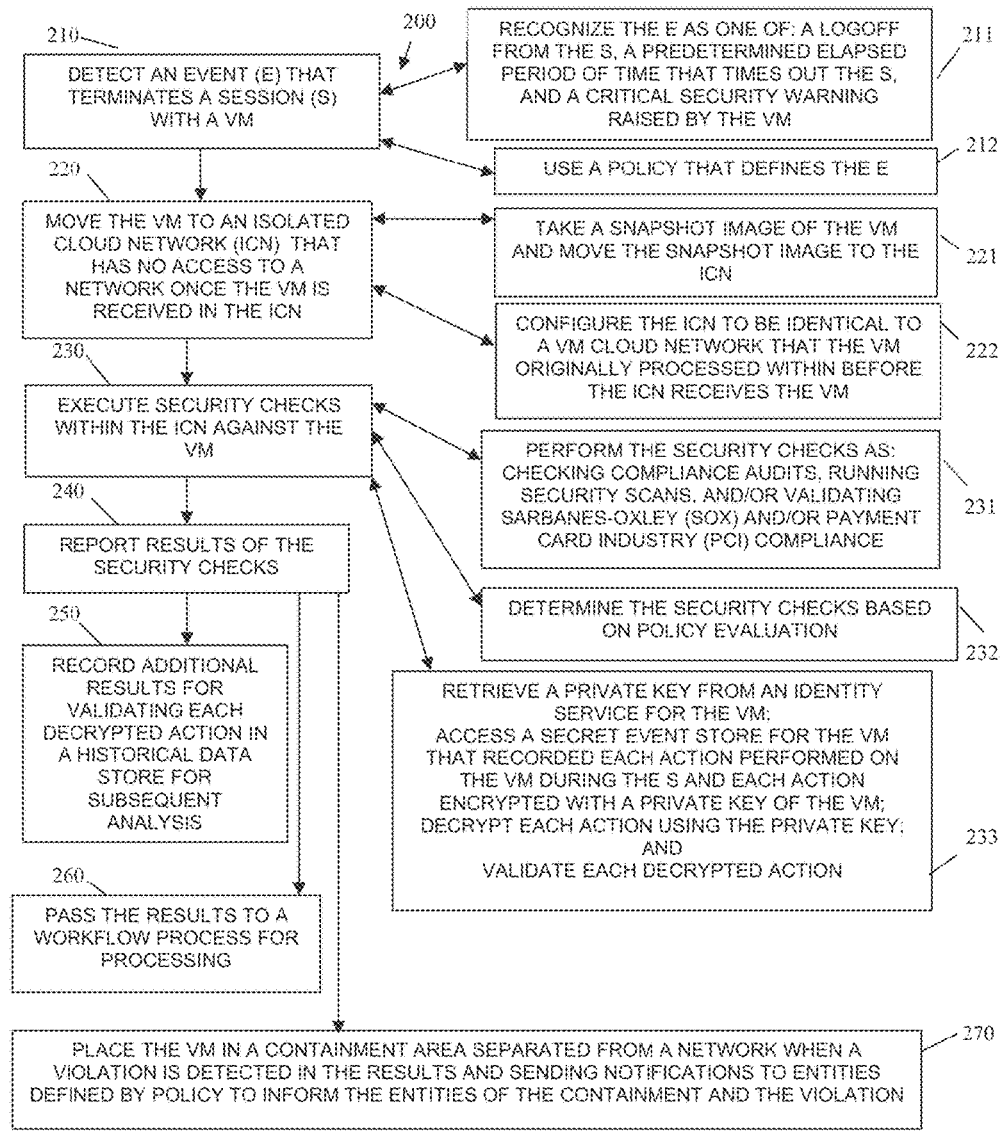
FIG. 2 is a diagram of a method for security auditing of cloud resources, according to an example embodiment.

FIG. 2 is a diagram of a method 200 for security auditing of cloud resources, according to an example embodiment. The method 200 (hereinafter "cloud auditor") is implemented and resides within a non-transitory computer-readable or processor-readable medium that executes on one or more processors of a network. Moreover, the cloud auditor is operational over a network and the network may be wired, wireless, or a combination of wired and wireless.

At 210, the cloud auditor detects and event that terminates a session with a virtual machine (VM). The processing that may occur before this event is detected was presented above with respect to the discussion of the FIG. 1, such as but not limited to a user authentication and using policy to configure the VM for the user within a cloud environment for the VM. It is also noted that in some cases the VM is equipped with a key logger that captures each mouse, keyboard, and action taken by the user during the VM session. The information captured is encrypted with a public key of the VM and housed in a secret encrypted store (as discussed above and briefly below). The detection of the event can occur in a variety of manners.

For example, at 211, the cloud auditor recognizes the event as one of: a logoff from the session made by a user or an automated process of the VM, a predetermined elapsed period of time that times out the session, and/or a critical security warning raised or issued by the VM.

In another case, at 212, the cloud auditor uses or evaluates a policy to define what type of events are used to detect a termination of the session or to automatically force the termination of the session.

At 220, the cloud auditor moves the VM to an isolated cloud network that has no access to a network once the VM is received in the isolated cloud network. That is, the isolated cloud network is configured to remove and add network connections as needed and once the migrated VM is moved to the isolated cloud network, the network connection can be disabled or removed.

According to an embodiment, at 221, the cloud auditor takes a snapshot image of the VM and then moves the snapshot image to the isolated cloud network. This can also include cloning the image to the isolated cloud network.

In another case, at 222, the cloud auditor configures the isolated cloud network to be identical or to simulate a VM cloud network that the VM originally processed within before the isolated cloud network receives the VM.

At 230, the cloud auditor executes security checks within the isolated cloud network against the VM. This can entail a variety of processing.

For example, at 231, the cloud auditor performs the security checks as: checking compliance audits, running security scans, and/or validating Sarbanes-Oxley (SOX) and/or Payment Card Industry (PCI) compliance. It is noted any type of auditing for compliance purposes can be configured to be processed against the VM in the isolated cloud network.

In a more generic and automated approach, at 232, the cloud auditor can determine the security checks based on policy evaluation.

In yet another situation, at 233, the cloud auditor retrieves a private key from an identity service; the private key is for the VM although not stored on or handled directly by the VM. Next, the cloud auditor accesses a secret event store for the VM. The secret store has each action (can include mouse events and keyboard events) performed against the VM during the session. Each action is encrypted with the private key of the VM (obtained from the identity service). Next, the cloud auditor decrypts each action using the private key and each decrypted action is validated.

At 240, the cloud auditor reports results for the security checks. This can occur in a variety of manners.

For example, at 250, the cloud auditor records additional results for validating each decrypted action in a historical data store for subsequent analysis.

In another situation, at 260, the cloud auditor automatically passes the results to a workflow process for automated processing or handling.

In still another scenario, at 270, the cloud auditor places the VM in a containment area separated from the network when a violation is detected in the results. Next, the cloud auditor sends notifications to entities defined by policy to inform the entities of the containment and the violation.

Figure 3:
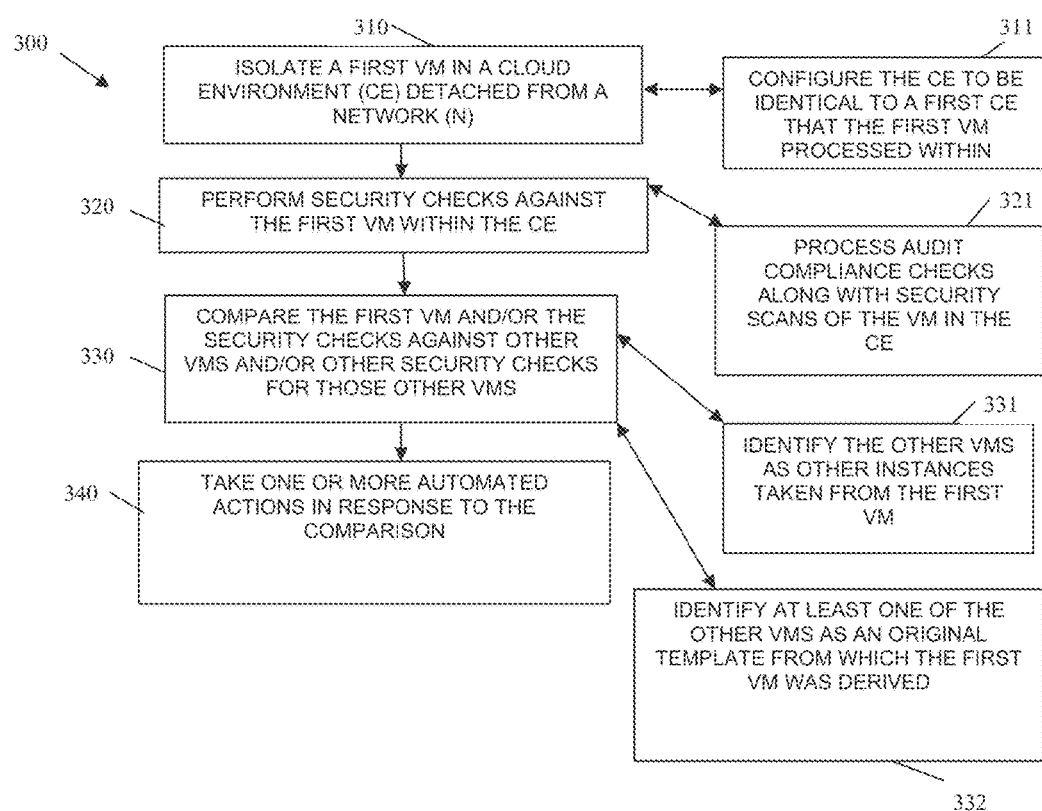
FIG. 3 is a diagram of another method for security auditing of cloud resources, according to an example embodiment.

FIG. 3 is a diagram of another method 300 for security auditing of cloud resources, according to an example embodiment. The method 300 (hereinafter "security audit manager") is implemented and resides within a non-transitory computer-readable or processor-readable medium that executes on one or more processors of a network. Moreover, the security audit manager is operational over a network and the network may be wired, wireless, or a combination of wired and wireless.

The security audit manager presents another and in some cases enhanced perspective of the cloud auditor represented by the method 200 of the FIG. 2 and discussed in detail above.

At 310, the security audit manager isolates a first VM in a cloud environment from a network. Again, this is done once the first VM is migrated to the isolated and jailed cloud environment.

According to an embodiment, at 311, the security audit manager configures the cloud environment to be identical to a first cloud environment that the first VM processed within.

At 320, the security audit manager performs security checks against the first VM within the cloud environment that is isolated and jailed from the network.

According to an embodiment, at 321, the security audit manager processes audit compliance checks along with security scans of the first VM in the cloud environment.

At 330, the security audit manager compares the first VM and/or the security checks against other VMs and/or other security checks for those other VMs.

In an embodiment, at 331, the security audit manager identifies the other VM as other instances taken from the first VM.

In another case, at 332, the security audit manager identifies the other VMs at least one of the other instances taken from the first VM as an original template from which the first VM was derived.

According to an embodiment, at 340, the security audit manager takes one or more automated actions in response to the comparison.

Figure 4:
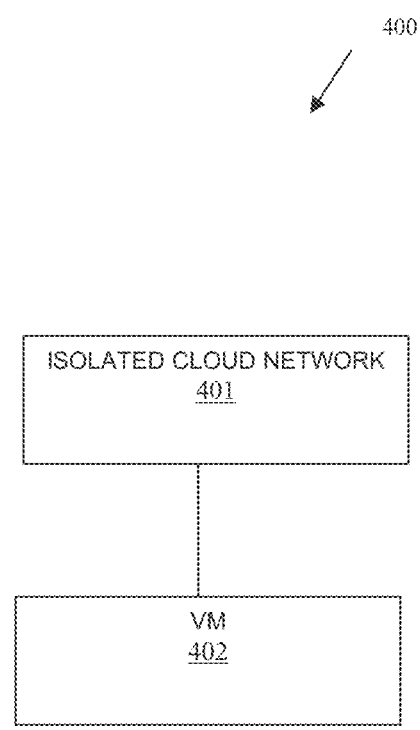
FIG. 4 is a diagram of a cloud security auditing system, according to the techniques presented herein.

FIG. 4 is a diagram of a cloud security auditing system 400, according to the techniques presented herein. The components of the cloud security auditing system 400 are implemented within and reside within a non-transitory and computer or processor-readable storage medium for purposes of executing on one or more processors of a network. The network may be wired, wireless, or a combination of wired and wireless.

The cloud security auditing system 400 implements, inter alia, various aspects of the FIG. 1, and the method 200 and the method 300 of the FIGS. 2 and 3, respectively.

The cloud security auditing system 400 includes an isolated cloud network 401 and a VM 402. Each of these components and their interactions with one another will now be discussed in detail. The isolated cloud network includes an entire cloud's infrastructure with multiple other networks.

The isolated cloud network 401 is implemented in a non-transitory computer-readable storage medium having one or more processors. Example aspects and processing associated with the isolated cloud network 401 were presented above with reference to the FIGS. 1-3.

The isolated cloud network 401 is configured to be connected and disconnected from a network.

The VM 402 is implemented in a non-transitory computer-readable storage medium having one or more processors. Example aspects and processing associated with the VM 402 were presented above with reference to the FIGS. 1-3.

The VM 402 is configured to be migrated to the isolated cloud network 401 for security auditing and result reporting.

According to an embodiment, the VM 402 is migrated to the isolated cloud network 401 as a snapshot image of the VM 402 from an original cloud processing environment that the VM 402 operates within.

Continuing with the previous embodiment and in some situations, the isolated cloud network 401 is configured to simulate the original cloud processing environment while the VM 401 is disconnected from the network within the isolated cloud network 401.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method for security auditing of cloud resources, comprising:
   capturing and encrypting events raised by a logical processing environment from a cloud during execution within the logical processing environment, wherein capturing further includes capturing keys typed within the logical processing environment as the events that are encrypted, and storing the encrypted events in an encrypted data store that is external to the logical processing environment;
   upon detection of termination of the logical processing environment, migrating the logical processing environment as an image of the logical processing environment to an isolated environment that lacks network connectivity;
   decrypting the encrypted events within the isolated environment;
   validating each of the events within the isolated environment; and
   reporting results of validating each of the events.

2. The method of claim 1, wherein capturing further includes identifying the logical processing environment as an instance of a user's virtual desktop infrastructure that processes in the cloud.

3. The method of claim 1, wherein migrating further includes taking control of access to the logical processing environment upon detection of the termination.

4. The method of claim 1, wherein migrating further includes detecting the termination as a logoff of a user from the logical processing environment.

5. The method of claim 1, wherein migrating further includes forcing the termination of the logical processing environment based on detection of a security warning raised from the logical processing environment during operation of the logical processing environment.

6. The method of claim 1, wherein migrating further includes forcing the termination of the logical processing environment upon detection of the logical processing environment being in a standby mode of operation.

7. The method of claim 1, wherein migrating further includes forcing the termination of the logical processing environment upon detection that a predetermined amount of time has lapsed with no activity being reported from the logical processing environment.

8. The method of claim 1, wherein migrating further includes taking a snapshot image of the logical processing environment and transferring the image to the isolated environment.

9. The method of claim 8, wherein transferring further includes loading and initiating the image within the isolated environment as the logical processing environment.

10. The method of claim 9, wherein validating further includes processing each of the events within the isolated environment.

11. A method for security auditing of cloud resources, comprising:
    recording events representing actions taking place within a logical processing environment processing within a cloud, wherein recording further includes recording the actions as keys typed within the logical processing environment;
    encrypting the events as encrypted events;
    storing the encrypted events in an encrypted data store that is external to the logical processing environment;
    taking an image of the logical processing environment upon detection of a particular event and transferring the image to an isolated environment that lacks network connectivity;
    forcing a termination of the logical processing environment when the particular event did not terminate the processing of the logical processing environment within the cloud;
    loading and initiating the logical processing environment within the isolated environment;
    decrypting the encrypted events from the encrypted data store as decrypted events;
    processing each of the decrypted events within an initiated instance of the logical processing environment and within the isolated environment; and
    reporting results from processing each of the decrypted events.

12. The method of claim 11 further comprising, processing the method as an audit of the logical processing environment.

13. The method of claim 11 further comprising, processing the method in response to a security concern raised with the logical processing environment.

14. The method of claim 11 further comprising, processing the method in response to an abnormal termination detected with the logical processing environment.

15. The method of claim 11, wherein taking an image of the logical processing environment further includes identifying the particular event as a logoff of a user from access to the logical processing environment.

16. The method of claim 11, wherein reporting further includes reporting the results with an indication as to whether the logical processing environment is associated with a security attack.

17. The method of claim 11, wherein reporting further includes reporting the results with an indication as to whether the logical processing environment passed a resource compliance check.

18. A system for security auditing of cloud resources, comprising:
    a first set of cooperating processors organized as a first logical processing environment representing a cloud;

a second set of cooperating processors organized as a second logical processing environment representing an isolated cloud that lacks network connectivity; and the first set of cooperating processors configured to:
- detect events for actions being processed within the first logical processing environment, when the actions include keys typed within the first logical processing environment;
- encrypt the events as encrypted events;
- store the encrypted events in an encrypted data store externally from the first logical processing environment;
- detect a particular event for the events;
- take an image of the first logical processing environment based on the particular event; and
- terminate processing associated with the first logical processing environment;

the second set of cooperating processors configured to:
- load the image for processing within the second logical processing environment;
- initiate the image for processing within the second logical processing environment;
- decrypt the encrypted events as decrypted events;
- process the decrypted events; and
- report an indication for results associated with processing the decrypted events.

19. The system of claim 18, wherein the at least one logical processing environment is one of: a virtual processing environment and an instance of a particular user's virtual desktop infrastructure.

* * * * *